(12) United States Patent
Wang

(10) Patent No.: US 8,782,462 B2
(45) Date of Patent: Jul. 15, 2014

(54) RACK SYSTEM

(75) Inventor: Hao-Hao Wang, Shanghai (CN)

(73) Assignee: Inventec Corporation, Taipei (TW)

( * ) Notice: Subject to any disclaimer, the term of this patent is extended or adjusted under 35 U.S.C. 154(b) by 304 days.

(21) Appl. No.: 13/372,206

(22) Filed: Feb. 13, 2012

(65) Prior Publication Data

US 2013/0138997 A1 May 30, 2013

(30) Foreign Application Priority Data

Nov. 28, 2011 (CN) .......................... 2011 1 0385725

(51) Int. Cl.
*G06F 11/00* (2006.01)

(52) U.S. Cl.
USPC .......................................... 714/5.11; 714/4.11

(58) Field of Classification Search
CPC ............ G06F 11/1662; G06F 11/2069; G06F 11/2089; G06F 11/2092; G06F 11/2097
USPC ................................................ 714/4.11, 5.11
See application file for complete search history.

(56) References Cited

U.S. PATENT DOCUMENTS

| | | | | |
|---|---|---|---|---|
| 8,037,364 B2* | 10/2011 | Kern et al. | .......... | 714/47.1 |
| 8,185,777 B2* | 5/2012 | Davies et al. | .......... | 714/4.11 |
| 8,566,624 B2* | 10/2013 | Johnson et al. | .......... | 713/300 |
| 2003/0188222 A1* | 10/2003 | Abbondanzio et al. | .......... | 714/12 |
| 2005/0257213 A1* | 11/2005 | Chu et al. | .......... | 717/170 |
| 2007/0220301 A1* | 9/2007 | Brundridge et al. | .......... | 714/4 |
| 2007/0255430 A1* | 11/2007 | Sharma et al. | .......... | 700/20 |
| 2008/0155300 A1* | 6/2008 | Yang | .......... | 714/1 |
| 2012/0116590 A1* | 5/2012 | Florez-Larrahondo et al. | .......... | 700/275 |
| 2013/0138769 A1* | 5/2013 | Wang | .......... | 709/217 |
| 2013/0138787 A1* | 5/2013 | Wang | .......... | 709/223 |
| 2013/0138788 A1* | 5/2013 | Wang | .......... | 709/223 |
| 2013/0138803 A1* | 5/2013 | Wang | .......... | 709/224 |
| 2013/0138805 A1* | 5/2013 | Wang | .......... | 709/224 |
| 2013/0138979 A1* | 5/2013 | Wang | .......... | 713/300 |

* cited by examiner

*Primary Examiner* — Marc Duncan
(74) *Attorney, Agent, or Firm* — CKC & Partners Co., Ltd.

(57) ABSTRACT

A rack system is provided. The rack system includes a first rack apparatus and a second rack apparatus. The first rack apparatus includes multiple first rack internal devices and a first Integrated Management Module (IMM). The first IMM manages the first rack internal devices via a network. The second rack apparatus includes multiple second rack internal devices and a second IMM. The second IMM manages the second rack internal devices via the network. The first IMM and the second IMM are connected via the network and implement a synchronous configuration process. When the second IMM goes abnormal, the first IMM manages the first rack internal devices and the second rack internal devices via the network at the same time.

10 Claims, 3 Drawing Sheets

RACK SYSTEM

CROSS-REFERENCE TO RELATED APPLICATION

This application claims the priority benefit of China application serial no. 201110385725.3, filed on Nov. 28, 2011. The entirety of the above-mentioned patent application is hereby incorporated by reference herein and made a part of this specification.

BACKGROUND OF THE INVENTION

1. Field of the Invention

The present invention generally relates to a rack system of a server, in particular, to a method for monitoring multiple rack systems.

2. Description of Related Art

Many enterprises set multiple servers according to cloud services to be provided or service demands, and integrate these servers into a rack system for centralized management, so as to save the management cost of the servers.

FIG. 1 is a schematic block diagram of a rack apparatus. The rack apparatus 100 is disposed with a network switch 120 and multiple servers 110_1 to 110_n, where n is a positive integer. The servers 110_1 to 110_n each have a network port, and the network ports are all connected to the network switch 120.

The servers 110_1 to 110_n are connected to the Internet 10 via the network switch 120, and the Internet 10 may also be referred to as a serving network. Each server is an independent computer system. For example, the servers 110_1 to 110_n each include a power supply, a Baseboard Management Controller (BMC), and multiple fans for heat dissipation. In the conventional rack apparatus 100, each of the servers 110_1 to 110_n manages its own power supply and fans through the BMC, so as to manage and control the power consumption and temperature therein.

Since relevant devices in the entire rack apparatus 100 need to be managed, the rack apparatus 100 is further provided with a management module. An Integrated Management Module (IMM) is critical to the rack system, so that a failure message must be informed in time if the IMM fails.

SUMMARY OF THE INVENTION

The present invention provides a rack system. In this rack system, the IMMs in every two rack apparatuses implement synchronous backup via the network, and back up each other when an abnormity occurs, so as to maintain the operation of the servers in the rack system and facilitate centralized management of the servers.

The present invention provides a rack system, which includes a first rack apparatus and a second rack apparatus. The first rack apparatus includes multiple first rack internal devices and a first IMM. The first IMM manages the first rack internal devices via a network. The second rack apparatus includes multiple second rack internal devices and a second IMM. The second IMM manages the second rack internal devices via the network. The first IMM and the second IMM are connected via the network and implement a synchronous configuration process. When the second IMM goes abnormal, the first IMM manages the first rack internal devices and the second rack internal devices via the network at the same time.

In an embodiment of the present invention, when implementing the synchronous configuration process, the first IMM backs up a piece of first configuration information of the first rack apparatus to the second rack apparatus, and the second IMM backs up a piece of second configuration information of the second rack apparatus to the first rack apparatus, so as to back up each other.

In an embodiment of the present invention, the first IMM and the second IMM monitor each other to determine whether any abnormity occurs. When the first IMM determines that the second IMM goes abnormal, and the first IMM manages the first rack internal devices and the second rack internal devices via the network at the same time, the first IMM detects the second rack apparatus to generate a detection result, and sends an alarm message containing at least one characteristic value of the second rack apparatus and the detection result.

In another aspect, the present invention provides a rack system. The rack system includes multiple rack apparatuses, and the rack apparatuses are allocated into multiple rack apparatus groups. Each rack apparatus group includes a first rack apparatus and a second rack apparatus. The first rack apparatus includes multiple first rack internal devices and a first IMM. The first IMM manages the first rack internal devices via a network. The second rack apparatus includes multiple second rack internal devices and a second IMM. The second IMM manages the second rack internal devices via the network. The first IMM and the second IMM are connected via the network and implement a synchronous configuration process. When the second IMM goes abnormal, the first IMM manages the first rack internal devices and the second rack internal devices via the network at the same time.

In view of the above, in the embodiment of the present invention, the rack system may allocate two rack apparatuses into the same rack apparatus group, and in the same rack apparatus group, the IMMs in the two rack apparatuses implement synchronous backup via the network and at the same time monitor each other to determine whether any abnormity occurs. When one IMM goes abnormal or fails, the other IMM in the same group may initiatively take charge of the management of the internal devices in the corresponding rack, and immediately report to the management personnel. In this manner, the IMMs in the rack are capable of backing up each other without increasing the hardware cost, which facilitates centralized management of the servers.

In order to make the aforementioned features and advantages of the present invention more comprehensible, embodiments are described in detail below with reference to the accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
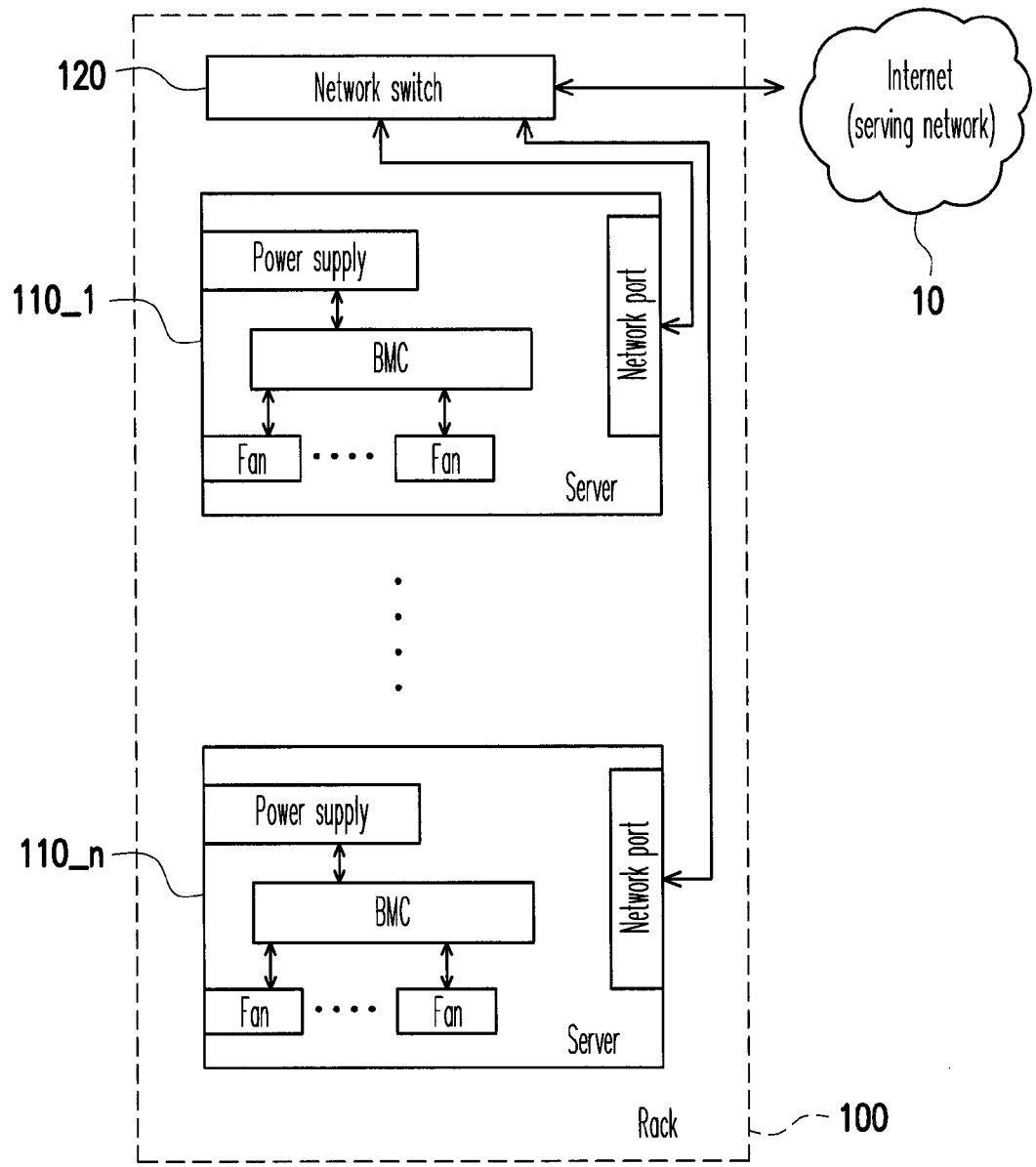
FIG. 1 is a schematic block diagram of a rack apparatus.

Reference will now be made in detail to the present embodiments of the invention, examples of which are illustrated in the accompanying drawings. Wherever possible, the same reference numbers are used in the drawings and the description to refer to the same or like parts.

Each rack system conventionally only has a single IMM, or is provided with multiple IMMs to back up each other, so as to avoid the circumstance that the rack system cannot operate due to the failure or damage of the IMM.

Therefore, the spirit of the embodiment of the present invention lies in that, the rack system allocates multiple rack apparatuses into groups, and the IMMs of the rack apparatuses in the same group implement synchronous backup via the network. When one IMM goes abnormal or fails, another IMM in the same group may initiatively play the role of the failed rack apparatus and take charge of the management thereof according to the backup configuration data, so as to maintain the normal operation of the rack apparatuses in the group.

Figure 2:
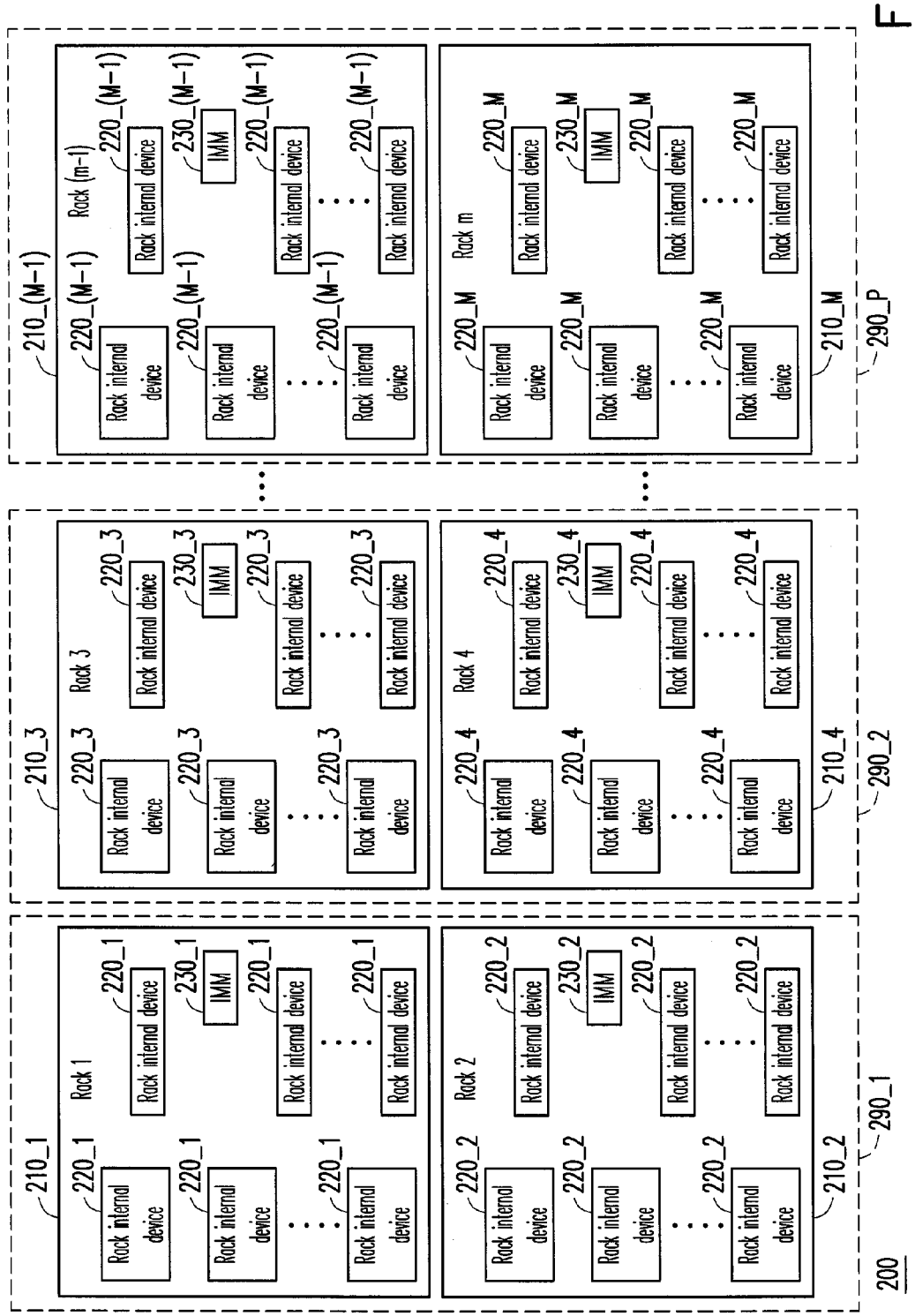
FIG. 2 is a schematic diagram of a rack system according to an embodiment of the present invention.

FIG. 2 is a schematic diagram of a rack system 200 according to an embodiment of the present invention. The rack system 200 includes multiple rack apparatuses 210_1 to 210_M, where M is a positive integer. Many manufacturers place the rack apparatuses 210_1 to 210_M in the same area, for example, in a container for centralized management and uniform transfer of the rack apparatuses 210_1 to 210_M. Therefore, the rack system 200 may also be called a container computer. For ease of description, in this embodiment, the rack apparatuses 210_1 to 210_M are respectively referred to as Rack 1 to Rack M.

The rack apparatuses 210_1 to 210_M each include multiple rack internal devices 220_1 to 220_M and IMMs 230_1 to 230_M. The IMMs 230_1 to 230_M respectively manage the corresponding rack internal devices 220_1 to 220_M via the network. In this embodiment, the rack internal devices 220_1 to 220_M may be multiple fan units, multiple power supplies, BMCs of servers and/or a combination thereof respectively disposed in each rack apparatus or chassis. The internal structure of the rack apparatuses 210_1 to 210_M will be illustrated in detail below.

Every two of the rack apparatuses 210_1 to 210_M are allocated into one group, and multiple rack apparatus groups 290_1 to 290_P are thus obtained, where P is a positive integer. It should be particularly noted herein that, in this embodiment, the rack apparatuses 210_1 to 210_M may be automatically grouped according to a distributed structure of the IMMs 230_1 to 230_M. In other words, in this embodiment, the corresponding IMMs 230_1 to 230_M are automatically matched through mutual communication between the IMMs 230_1 to 230_M and according to the characteristic values of the IMMs 230_1 to 230_M, so that every two rack apparatuses are allocated into the same rack apparatus group, and the groups 290_1 to 290_P are obtained. The characteristic value may be a name, a network protocol address and/or a Media Access Control (MAC) address of each of the IMMs 230_1 to 230_M.

For example, each of the IMMs 230_1 to 230_M may independently create a rack information form, write characteristic values related to the IMMs 230_1 to 230_M (for example, the name, serial number, network protocol address and/or MAC address of each IMM) into the rack information form, and send the characteristic value of its own to the nearby IMMs via a management network, so as to improve the rack information form in each of the IMMs 230_1 to 230_M. Then, the IMMs 230_1 to 230_M may automatically match the corresponding IMMs 230_1 to 230_M according to a grouping determination process, so that every two rack systems can be allocated into the same group. In this embodiment, each of the rack apparatus groups 290_1 to 290_P includes two rack apparatuses, for example, the rack apparatus group 290_1 includes Rack 1 and Rack 2, the rack apparatus group 290_2 includes Rack 3 and Rack 4, . . . , and the rack apparatus group 290_P includes Rack (M−1) and Rack M.

Figure 3:
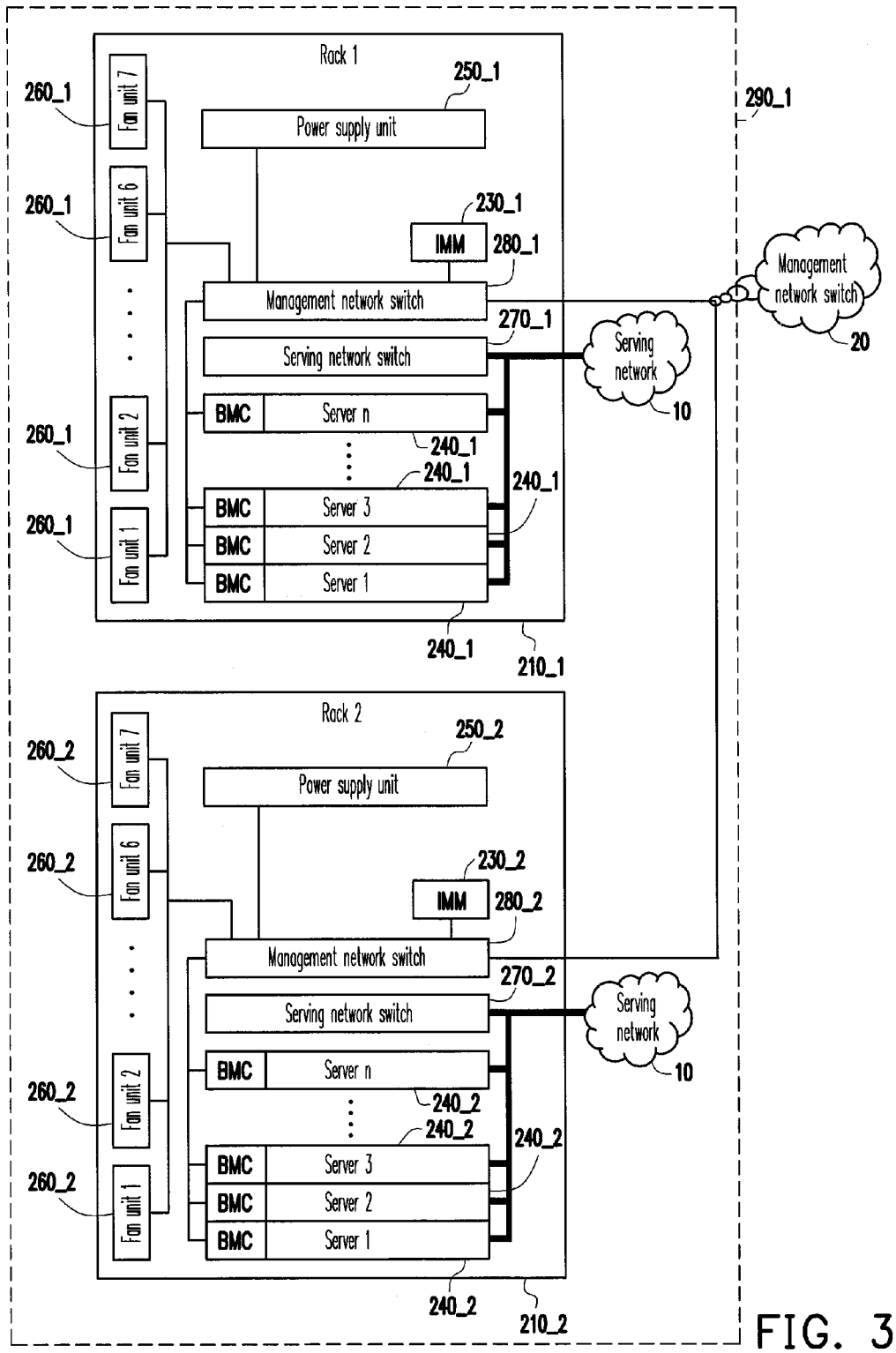
FIG. 3 is a schematic diagram of a functional module in a rack apparatus group according to an embodiment of the present invention.

The rack apparatus group 290_1 shown in FIG. 3 is taken as an example for illustrating the embodiment of the present invention, and FIG. 3 is a schematic diagram of a functional module in the rack apparatus group 290_1 according to an embodiment of the present invention. The rack apparatus group 290_1 has the rack system 210_1 (Rack 1) and the rack system 210_2 (Rack 2). In FIG. 3, Rack 1 and Rack 2 respectively include the IMMs 230_1 to 230_2, multiple servers 240_1 to 240_2, at least one power supply unit 250_1 to 250_2, multiple fan units 260_1 to 260_2, serving network switches 270_1 to 270_2 and management network switches 280_1 to 280_2. Since Rack 1 and Rack 2 have the same structure, Rack 1 is used as an example below. Rack 2 to Rack M may be deduced from Rack 1.

In Rack 1, the servers 240_1 each have a serving network port respectively connected to multiple network connection ports of the serving network switch 270_1. The serving network switches 270_1 and 270_2 are respectively connected to the serving network 10 (for example, the Internet). Therefore, the servers 240_1 may provide services through the serving network switch 270_1 to the serving network 10.

The servers 240_1 each have a BMC, and the BMCs each have a management network port. The management network ports of the BMCs are respectively connected to one of the multiple network connection ports of the management network switch 280_1. The management network switch 280_1 is connected to the management network 20.

It should be particularly noted that, the management network switches 280_1 to 280_2 located in the rack apparatus group 290_1 may be connected to each other through the respective network connection ports, or connected to a public network switch, so as to be connected to the management network 20. A remote integration management center may be connected to the management network 20 through the public network switch, and the management personnel may receive an alarm message through the remote integration management center, so as to recover the device initiating the alarm message from a failure in real time. Thereby, the management network 20 may be a Local Area Network (LAN), for example, the Ethernet. The management network switches 280_1 to 280_2 may be Ethernet switches or other LAN switches.

The management network port of the IMM 230_1 is connected to the management network switch 280_1. In Rack 1, the IMM 230_1 communicates with the BMCs of the servers 240_1 through the management network switch 280_1, so as to implement a server management process. That is, the IMM 230_1 communicates with the BMCs of the servers 240_1 to acquire the operating status of the servers 240_1 (for example, the operating status such as the temperature inside the server), and/or control the operation of the servers 240_1 (for example, control the on/off of the servers, firmware update or other operations).

Rack 1 is disposed with at least one power supply unit 250_1, and the power supply unit 250_1 provides power for each device in Rack 1. For example, the power supply unit 250_1 provides power for the management network switch 280_1, the serving network switch 270_1, the servers 240_1, the fan units 260_1 and the IMM 230_1 in Rack 1. The power supply unit 250_1 has a management network port, and the management network port is connected to the management network switch 280_1. The multiple fan units 260_1 also have management network ports. The management network ports of the fan units 260_1 are also connected to the management network switch 280_1.

Thereby, the IMM 230_1 may communicate with the power supply unit 250_1 and the fan units 260_1 through the management network switch 280_1 by implementing a power management process and/or a heat dissipation management process, to acquire the operating status of the power supply unit 250_1 and the fan units 260_1, and/or control the operation of the power supply unit 250_1 and the fan units 260_1. For example, the IMM 230_1 may acquire related power consumption information and fan operation information of Rack 1, the multiple servers 240_1, and the fan units 260_1 through the management network switch 280_1, for example, acquire the amount of power consumption of all the servers 240_1 and the rotation speed of the fan units 260_1. According to the power consumption information or the fan operation information, the IMM 230_1 issues a control command through the management network switch 280_1 to the power supply unit 250_1 and the fan units 260_1, to control/adjust the power output of the power supply unit 250_1, or control/adjust the rotation speed of the fan units 260_1.

The rack apparatus 210_2 (Rack 2) also includes the IMM 230_2, the multiple servers 240_2, the power supply unit 250_2, the fan units 260_2, the serving network switch 270_2 and the management network switch 280_2. The functions of the devices are the same as the corresponding devices in Rack 1, so the details will not be repeated herein.

In other words, in this embodiment, the rack internal devices 220_1 shown in FIG. 2 are the multiple fan units 260_1, the power supply unit 250_1 and the BMCs of the servers 240_1 of Rack 1 in FIG. 3. The internal devices in Rack 1 are all connected to the first switch (for example, the management network switch 230_1). Thereby, the IMM 230_1 of Rack 1 can be connected to the IMM 280 of Rack 2 through the Ethernet protocol by using the first switch (the management network switch 230_1) and the second switch (the management network switch 230_2).

It should be particularly noted that, two IMMs (for example, the IMMs 230_1 and 230_2) in the same group (for example, the rack apparatus group 280_1) may be connected to each other via the network and implement the synchronous configuration process, so as to back up the configuration information for each other. Specifically, when implementing the synchronous configuration process, the IMM 230_1 backs up the configuration information in Rack 1 to the IMM 230_2 in Rack 2. Correspondingly, the IMM 230_2 may also back up the configuration information in Rack 2 to the IMM 230_1 in Rack 1, so as to back up each other.

The configuration information herein refers to related information that the IMM needs to know when managing and controlling the rack internal devices in the corresponding rack apparatus. The configuration information also includes related parameters set by the IMM for each rack internal device. Taking the IMM 230_1 in Rack 1 as an example, the configuration information generated by the IMM 230_1 includes the network protocol address of the IMM 230_1, the network protocol address of each rack internal device 220_1 (for example, the multiple fan units 260_1, the power supply unit 250_1 and the BMCs of the servers 240_1 of Rack 1 in FIG. 3), and the configuration setting information set by the IMM 230_1 for each rack internal device 220_1, that is to say, the configuration setting information may be the related parameters already set for the rack internal devices 220_1.

For example, referring to FIG. 3, the rack internal devices 220_1 respectively adjust the rotation speed of the fan units 260_1 according to temperature information of the servers 240 in different areas, adjust power supply parameters of the power supply unit 250_1 for different servers 240_1, and adjust the configuration information such as the corresponding form created by the BMC in each server 240_1.

Further, the two IMMs in the same group may monitor each other to determine whether any abnormality occurs. When one IMM goes abnormal, the other IMM in the same group may implement backup in real time according to the backup configuration information. For example, the IMM 230_1 in Rack 1 may periodically send an acknowledgment request to the IMM 230_2 in Rack 2, and receive an acknowledgment response returned by the IMM 230_2, so as to acknowledge whether the network link from the IMM 230_1 to the IMM 230_2 is smooth and at the same time acknowledge that no abnormality occurs to the IMM 230_2.

If the IMM 230_1 occasionally does not receive the acknowledgment response returned from the IMM 230_2, for example, the consecutive times that the IMM 230_1 does not receive the acknowledgment response is smaller than a threshold, it is possible that the IMM 230_2 is fully loaded at that time and the network link is so congested that the acknowledgment response cannot be received for the moment, and this situation is allowed to occur occasionally. However, when the consecutive times that the IMM 230_1 does not receive the acknowledgment response exceeds the threshold, the IMM 230_1 determines that an abnormality occurs.

In similar embodiments, the IMM 230_1 may also intercept the communication connection condition of the IMM 230_2, to determine whether any abnormality occurs. In other words, since the IMM 230_2 periodically implements communication connection on the servers 240_2 of Rack 2, the IMM 230_1 may determine whether any abnormality occurs to the network link from the IMM 230_2 or the IMM 230_1 to the IMM 230_2 by intercepting the network packet receiving/transmitting condition of the IMM 230_2.

When the IMM 230_1 determines that the IMM 230_2 already goes abnormal, the IMM 230_1 may manage the rack internal devices 220_1 and the rack internal devices 220_2 at the same time through the management network switch 280_1 and the management network 20 according to the configuration information of Rack 2 backed up by the IMM 230_2 in the IMM 230_1, so as to maintain normal operation of Rack 2. The IMM 230_1 may implement the server management process, the heat dissipation management process and/or the power management process, to manage the rack internal devices 220_1 of Rack 1 and the rack internal devices 220_2 of Rack 2 at the same time.

When the IMM 230_2 goes abnormal, and the IMM 230_1 manages the rack internal devices 220_1 and the rack internal devices 220_2 via the management network at the same time, the IMM 220_1 also detects the devices in Rack 2 to generate a detection result about Rack 2, and sends an alarm message containing at least one characteristic value of Rack 2 and the detection result to the remote integration management center in the management network 20, so that the management personnel may acquire the abnormality message in time, and immediately recover the IMM 230_2.

The characteristic value herein may be the name, serial number, network protocol address and/or MAC address corresponding to the IMM 230_2. The characteristic value of the IMM 230_2 is contained in the alarm message to inform the remote integration management center that the IMM 230_2 already goes abnormal. The alarm message may include an Email message, a system log and/or a Simple Network Management Protocol (SNMP) Trap message, and the type of the alarm message is not limited in the embodiment of the present invention.

In view of the above, in the embodiment of the present invention, the rack system may allocate two rack apparatuses 210_1 to 210_2 into the same rack apparatus group 290_1. In the same rack apparatus group 290_1, the IMMs in the two rack apparatuses implement synchronous backup via the network and at the same time monitor each other to determine whether any abnormity occurs. When one IMM (for example, the IMM 230_2) goes abnormal or fails, the other IMM (for example, the IMM 230_1) in the same group may initiatively take charge of the management of the internal devices in Rack 2, and immediately report to the management personnel. In this manner, the IMMs in the rack are capable of backing up each other without increasing the hardware cost, which facilitates centralized management of the servers.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A rack system, comprising:
   multiple rack apparatuses, wherein the rack apparatuses are allocated into multiple rack apparatus groups, and each rack apparatus group comprises:
      a first rack apparatus, comprising multiple first rack internal devices and a first Integrated Management Module (IMM), wherein the first IMM manages the first rack internal devices via a network; and
      a second rack apparatus, comprising multiple second rack internal devices and a second IMM, wherein the second IMM manages the second rack internal devices via the network, and the first IMM and the second IMM are connected via the network and implement a synchronous configuration process,
   wherein when the second IMM goes abnormal, the first IMM manages the first rack internal devices and the second rack internal devices via the network at the same time, and the rack apparatuses are respectively configured with multiple IMMs, and the IMMs automatically match the corresponding IMMs according to at least one characteristic value of the IMMs, so that every two rack apparatuses are allocated into the same rack apparatus group.

2. The rack system according to claim 1, wherein the characteristic value is a name, a network protocol address and/or a Media Access Control (MAC) address of the respective IMM.

3. The rack system according to claim 1, wherein when implementing the synchronous configuration process, the first IMM backs up a piece of first configuration information of the first rack apparatus to the second rack apparatus, and the second IMM backs up a piece of second configuration information of the second rack apparatus to the first rack apparatus.

4. The rack system according to claim 3, wherein the first configuration information comprises a network protocol address of the first IMM and multiple device addresses and multiple pieces of configuration setting information of the first rack internal devices.

5. The rack system according to claim 1, wherein the first IMM and the second IMM monitor each other to determine whether any abnormity occurs; when the first IMM determines that the second IMM goes abnormal, and the first IMM manages the first rack internal devices and the second rack internal devices via the network at the same time, the first IMM detects the second rack apparatus to generate a detection result, and sends an alarm message containing at least one characteristic value of the second rack apparatus and the detection result.

6. The rack system according to claim 5, wherein the first IMM periodically sends an acknowledgment request to the second IMM and receives an acknowledgment response returned by the second IMM, and when the times that the first IMM does not receive the response signal exceeds a threshold, the first IMM determines that an abnormity occurs.

7. The rack system according to claim 5, wherein the first IMM intercepts a network connection condition of the second IMM, to determine whether any abnormity occurs.

8. The rack system according to claim 1, wherein the first rack internal devices and the second rack internal devices are respectively multiple Baseboard Management Controllers (BMCs), multiple fan units, multiple power supplies and/or a combination thereof disposed in the first rack apparatus and the second rack apparatus.

9. The rack system according to claim 1, wherein the first IMM implements a server management process, a heat dissipation management process and/or a power management process to manage the first rack internal devices and/or the second rack internal devices.

10. The rack system according to claim 1, wherein the first rack apparatus further comprises a first switch, the second rack apparatus further comprises a second switch, the first IMM is connected to the second IMM via an Ethernet protocol through the first switch and the second switch, and the first rack internal devices and the second rack internal devices are respectively connected to the first switch and the second switch,
   wherein when the second IMM goes abnormal, the first IMM manages and controls the second rack internal devices through the first switch and the second switch.

* * * * *